United States Patent [19]

Fuss et al.

[11] Patent Number: 4,667,521
[45] Date of Patent: May 26, 1987

[54] LOAD-MEASURING ARRANGEMENT

[75] Inventors: Hermann Fuss; Hermann Glöckner, both of Schweinfurt, Fed. Rep. of Germany

[73] Assignee: SKF GmbH, Schweinfurt, Fed. Rep. of Germany

[21] Appl. No.: 806,683

[22] Filed: Dec. 9, 1985

[30] Foreign Application Priority Data

Dec. 8, 1984 [DE] Fed. Rep. of Germany ... 8435935[U]

[51] Int. Cl.[4] .......................... G01L 5/00; G01L 1/22
[52] U.S. Cl. .............................. 73/862.54; 73/862.67
[58] Field of Search ........................ 73/862.54, 862.67

[56] References Cited

U.S. PATENT DOCUMENTS 4,203,319 5/1980 Lechler ........................... 73/862.54
4,341,122 7/1982 Lechler et al. ................... 73/862.04

Primary Examiner—Charles A. Ruehl
Attorney, Agent, or Firm—Rosen, Dainow & Jacobs

[57] ABSTRACT

A load-measuring arrangement for a rolling bearing consisting of a plurality of measuring junctions, each junction being connected to a respective pair of strain transducers arranged along a curved segment of a bearing ring, the strain transducers of each pair being circumferentially displaced at a predetermined interval corresponding to half the distance between adjacent rolling bodies. Each measuring junction is connected to an adder by way of a respective amplifier and rectifier. The plurality of strain transducers are sequentially arranged at narrow intervals along the curved segment, the length of the curved segment corresponding to the distance between adjacent rolling bodies.

1 Claim, 2 Drawing Figures

LOAD-MEASURING ARRANGEMENT

FIELD OF THE INVENTION

The invention relates to an arrangement for measuring the loads in a bearing.

BACKGROUND OF THE INVENTION

A measuring arrangement of the foregoing type is disclosed in German Pat. No. W 2746937. This prior art reference discloses a load-measuring bearing in which the material strain under loading above the rolling bodies is measured by wire strain gauges arranged in the main loading zone of the bearing ring. The strain gauges are, as already generally known, arranged along a circumferential direction of the bearing ring such that when one strain gauge lies in the vicinity of a rolling body, a second strain gauge lies exactly between two adjacent rolling bodies. Both strain gauges are electrically connected to a half-bridge and produce, in contrast to an arrangement using only a single strain gauge, an output signal which is double in amplitude. This results from the fact that in the loading zone of the bearing ring a material stretching occurs in the area of contact with a rolling body and material contraction occurs in the area between adjacent rolling bodies. In the half-bridge a doubled displacement of the bridge midpoint is achieved as a result of the reduction in resistance of one strain gauge and the increase in resistance of the other strain gauge. A load-measuring bearing constructed in this way generates an AC voltage having an amplitude proportional to the bearing loading and a frequency dependent on the rotational speed and the number of rolling bodies. This construction is satisfactory provided that the load-measuring bearing rotates at a sufficiently high speed and sufficiently many voltage pulses are supplied to the connected measuring system. In the case of low rotational speed and consequently small rolling frequency and in particular in the case of small loading of the load-measuring bearing, large time intervals between individual voltage pulses are produced so that the measuring system must work with a high average time constant. For this reason the reading is very inexact and often not reproducible.

SUMMARY OF THE INVENTION

The object of the invention is to provide a measuring arrangement of the above-described type which can produce sufficiently accurate measurements in the case of low rotational speed of the load-measuring bearing.

This object is attained by providing at least two measurement junctions arranged along a curved segment of the outer ring and connected to an adder by way of separate amplifiers and rectifiers.

By providing two measuring junctions, the number of voltage pulses per unit time output by the measuring system is doubled for the same rotational speed, whereby the average time constant advantageously need be only half as great. For this reason the reading speed is moreover doubled, which has a great advantage in the case of rapidly changing loads. The second measuring junction also consists of a pair of wire strain gauges connected to a half-bridge, which strain gauges are arranged in the circumferential direction at locations displaced relative to the strain gauges of the first measuring junction. The half-bridges of both measuring junctions are in each case connected to separate amplifiers, which are in turn connected to separate rectifiers. Thereafter the measurement signals are delivered to an adder, the output signal of which is directly supplied to an indicating instrument which displays the value of the load. The rolling bodies first roll over the position corresponding to the first measuring junction and thereafter roll over the position spaced at an interval corresponding to the second measuring junction, so that the voltage pulses of both measuring junctions follow each other in time and therefore no addition of the voltage amplitudes occurs. Depending on the dimensions of the individual strain gauges, more measuring junctions can be installed. However, it is expedient not to arrange strain gauges beyond the curved segment corresponding to the interval between adjacent rolling bodies.

Particularly advantageous results are attained if the strain gauges are tightly juxtaposed. In this case the corresponding loading of the load-measuring bearing can be determined with the smallest possible time intervals between the individual voltage pulses. Furthermore, if the surface area occupied by each strain gauge is correspondingly smaller, more measuring junctions can be arranged along the available curved segment.

BRIEF DESCRIPTION OF THE DRAWINGS

The preferred embodiment of the invention will be described in detail with reference to the following drawings.

DETAILED DESCRIPTION OF THE PREFERRED EMBODIMENT

Figure 1:
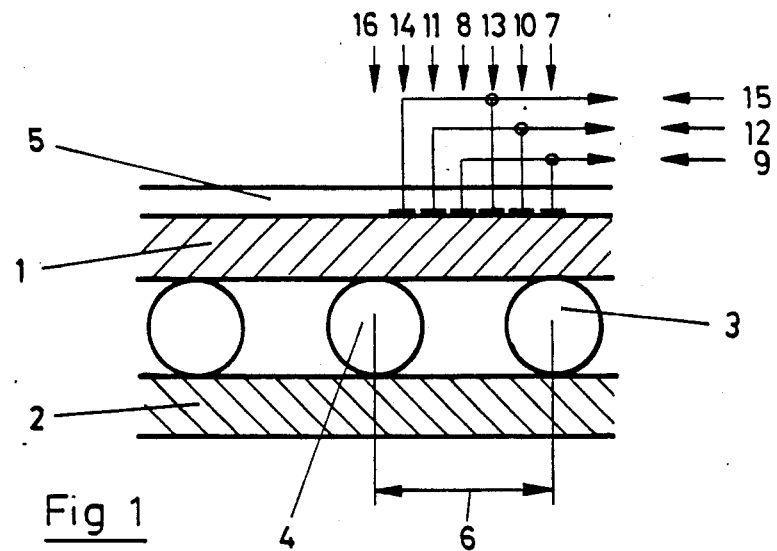
FIG. 1 is a partial sectional view of a load-measuring bearing with three measurement junctions.

For the sake of simplicity, FIG. 1 shows a section of a load-measuring bearing with the outer ring 1 and the inner ring 2 unrolled, i.e. not curved in the shape of a ring, but on the contrary linearly straightened. The load-measuring bearing comprises an outer ring 1, an inner ring 2, and balls 3, 4 arranged therebetween. The outer ring is provided with a circumferential groove 5 disposed axially in the zone of primary stress, i.e. in the axial middle of a normally symmetric bearing. Along the curved segment extending between the centers of two balls 3, 4 six wire strain gauges 7, 8, 10, 11, 13, 14 are sequentially arranged in the circumferential direction. The strain gauges are disposed relatively close to each other with only small interstitial spaces therebetween, whereby nearly the entire length of the curved segment 6 is utilized and only in the stress zone of the second ball 4 (shown in the middle) is the curved segment 6 without a strain gauge. In the preferred embodiment of the invention depicted in FIG. 1 the first wire strain gauge 7 lies in the stress zone of the first ball 3 (shown on the right) and is there stretched as a result of the stress generated by the rolling ball 3 and the resultant elastic deformation of the material of the outer ring 1. A second wire strain gauge 8 works together with the first strain gauge 7 and is mounted between the two balls 3, 4 at a distance halfway along the curved segment 6. The two strain gauges 7, 8 are interconnected to a half-bridge (not shown in detail) and form a first measuring junction 9, whereby the corresponding bridge voltage is produced by stretching of the first strain gauge 7 and contraction of the second strain gauge 8. A pair of additional strain gauges 10, 11 arranged at the same interval are connected to a second measuring junction 12. A third pair of strain gauges 13, 14 form a third measuring junction 15 in an analogous manner. When the rightmost ball 3 shown in FIG. 1 rolls in the circumferential direction relative to the outer ring 1, ball 3 rolls over the outer ring surface directly adjacent the strain gauge 10 of the second measuring junction 12 and thereafter the strain gauge 13 of the third measuring junction 15. In this sequence the half-bridges of each measuring junction 9, 12, 15 one after the other output, for example, voltage pulses, which are separated from each other by only a small interval of time. Thereafter this first ball 3 rolls over the second strain gauges 8, 11, 14 of each measuring junction, i.e. half-bridge, whereby in conformity with the aforementioned positive voltage pulses, here negative voltage pulses are form. Their polarity, however, is changed by means of rectification, so that a DC voltage train of pulses separated by small intervals of time is output. Upon further rolling, ball 3 reaches a position adjacent to the vacancy, i.e. the space along curved segment 6 without a strain gauge mounted thereon, corresponding to the original position of the second ball 4 (depicted in the middle of FIG. 1). At the same time the next ball (not shown) rolls into the position adjacent the first strain gauge 7 and the above-described steps are repeated. In this way each rolling ball produces a train of six voltage pulses during a single revolution in the load-sensing bearing.

Figure 2:
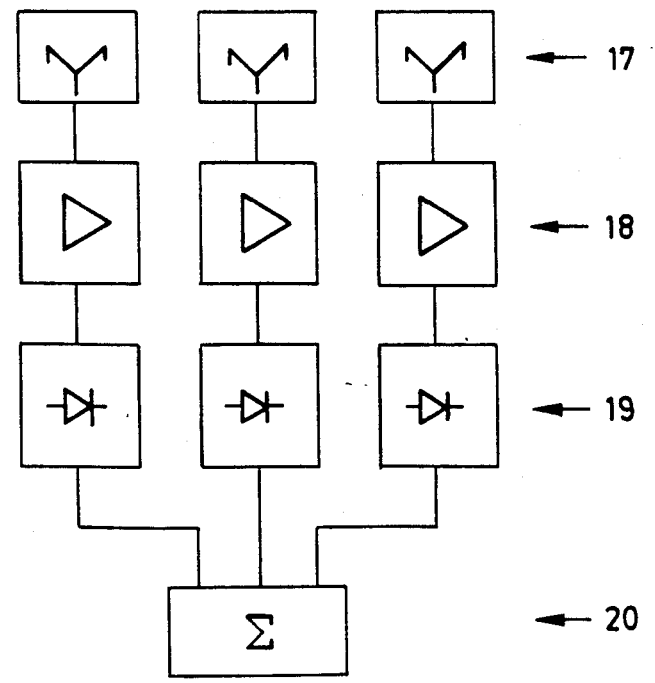
FIG. 2 is a block diagram of the measuring instrument for connection to the load-measuring bearing of FIG. 1.

FIG. 2 shows a block diagram of the electronic portion of the measuring device in accordance with the invention. For the three separate measuring postions 9, 12, 15 three separate identical measuring channels are provided. Each channel consists of the half-bridge 17 and two strain gauges forming the respective measuring junction, an amplifier 18 and a rectifier 19. The three measurement voltages are output to an adder 20, at the output of which the timed sequence of individual voltage pulses are available for reading or further processing.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. A load-measuring arrangement for a rolling bearing having an outer ring, an inner ring, and a row of rolling bodies arranged therebetween, consisting of a first measuring junction connected to first and second strain transducing means arranged respectively at first and second positions circumferentially displaced along one of said rings for the acquisition of material strain data, said first and second positions being arranged along a curved section of said one ring at a predetermined interval corresponding to half the distance between adjacent rolling bodies, a second measuring junction being provided connected to third and fourth strain transducing means arranged respectively at third and fourth positions along said one ring, said third and fourth positions being arranged along said curved section and separated by said predetermined interval, and each of said measuring junctions being connected to an adder by way of an amplifier and a rectifier, the improvement wherein said third and fourth strain transducing means are respectively circumferentially displaced from said first and second strain transducing means at a narrow interval less than said predetermined interval.

* * * * *